Figure 1:
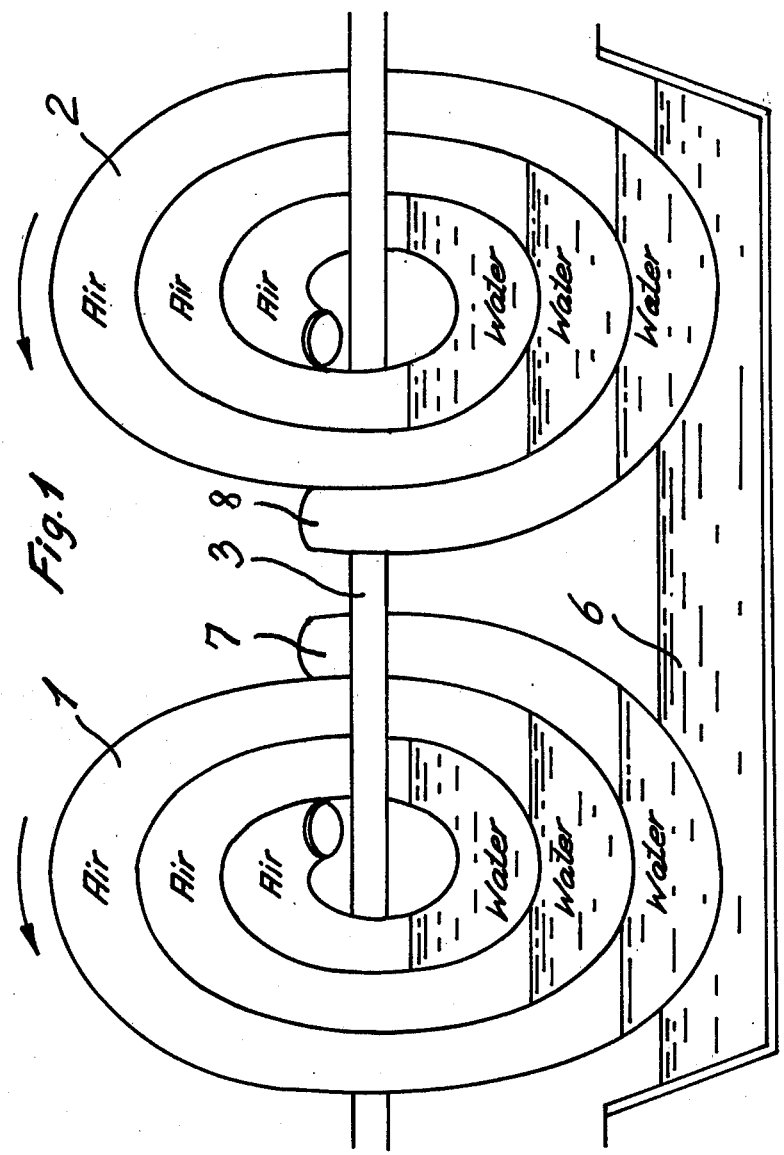

United States Patent [19]

Frandsen

[11] 4,351,721
[45] Sep. 28, 1982

[54] DEVICE FOR FLUSHING AND AERATING A SURFACE COATED WITH MICROORGANISMS IN A PLANT FOR BIOLOGICAL PURIFICATION OF WASTE WATER

[76] Inventor: Aksel S. Frandsen, Vandværksvej 35, Børkop, Denmark

[21] Appl. No.: 233,310

[22] PCT Filed: Jun. 25, 1980

[86] PCT No.: PCT/DK80/00037
§ 371 Date: Feb. 26, 1981
§ 102(e) Date: Feb. 11, 1981

[87] PCT Pub. No.: WO81/00101
PCT Pub. Date: Jan. 22, 1981

[30] Foreign Application Priority Data

Jun. 26, 1979 [DK] Denmark ............................ 2676/79

[51] Int. Cl.³ .............................................. C02F 3/08
[52] U.S. Cl. .................... 210/150; 210/619; 261/92
[58] Field of Search ............ 210/150, 151, 619, 616; 261/92

[56] References Cited

U.S. PATENT DOCUMENTS 2,106,025 1/1938 Faber .................................... 261/92
3,875,058 4/1975 Nordgård ............................. 261/92
4,267,051 5/1981 Uhlmann ............................. 210/150

FOREIGN PATENT DOCUMENTS 2849031 5/1979 Fed. Rep. of Germany ...... 210/150
51-120047 10/1976 Japan .................................... 210/150
345842 6/1972 Sweden ................................. 210/150
353301 1/1973 Sweden ................................. 210/150

Primary Examiner—Benoît Castel
Attorney, Agent, or Firm—Holman & Stern

[57] ABSTRACT

A rotary system composed of two worms (1 and 2) which are built together and interconnected at their central coils by a pipe conduit (4), said worms having their respective coils oppositely directed to one another and consisting of spirally coiled pipes rotatable about a horizontal axis (3), is used for flushing and aerating a medium which is disposed in the pipes and coated with microorganisms. The microorganisms take up nutrients from waste water (6) in a biological purification process, one worm (1) with part of its periphery immersed in the water (6) lifting quantities of water towards its center, the other worm (2) lowering the water to the original level. This provides for alternate flushing and aeration, and the weight of the water in said second worm (2) provides a torque which contributes towards driving the system.

4 Claims, 2 Drawing Figures

U.S. Patent  Sep. 28, 1982  Sheet 1 of 2  4,351,721

DEVICE FOR FLUSHING AND AERATING A SURFACE COATED WITH MICROORGANISMS IN A PLANT FOR BIOLOGICAL PURIFICATION OF WASTE WATER

BACKGROUND OF THE INVENTION

1. Field of the Invention

The present invention relates to a device for flushing and aerating a surface coated with microorganisms in a plant for biological purification of waste water. The device comprises a rotor (worm) in the form of a spirally coiled channel which is rotatable about a horizontal axis above the surface of the waste water so that the inlet mouth of the channel receives air as well as waste water during its rotation, and is characterized in that the rotor has its central coil connected to the central coil of a corresponding rotor of opposite coil direction and mounted coaxially with the first one so that its outlet mouth is located below the surface of the waste water during part of its rotation, and in that both rotors are filled with a medium on which microorganisms can grow.

2. Description of the Prior Art

Biological purification of waste water can be effected by causing a medium, e.g. broken stones, plastic balls or the like, to be coated with microorganisms that consume nutrients, ammonia and the like, by irrigating it with or immersing it in waste water. This reduces the contents of such substances in the water.

A known rotary filter plant comprises a drum which contains a light medium, such as plastic rings or balls, and rotates with part of its periphery immersed in the waste water. This plant suffers from the drawbacks that the medium is insufficiently aerated and flushed in the interior of the drum, resulting in a poor utilization of the active surface of the medium and insufficient replacement of the coating of microorganisms. Moreover, the plant tends to freeze at low temperatures. Attempts have been made to overcome these drawbacks by using blowers and pumps, but this is complicated and energy consuming.

The Swedish Published Application No. 345 842 discloses a worm-shaped contact filter disc for biological purification of waste water. This disc consists of a spirally coiled channel rotatable about a horizontal axis above the surface of the water. During rotation the channel inlet is alternately filled with air and water at the periphery of the disc. Both air and water are guided to the outlet of the channel at the centre of the disc during rotation, to thereby provide effective contact between the surface of the channel and alternately air and water throughout the length of the channel. This admittedly brings about a favourable environment for anaerobic microorganisms everywhere in the channel, but the device is rather energy consuming since the weight of the water which is transported by the disc is not used to provide a torque. Here too, the coating of microorganisms is replaced relatively slowly, and the device easily freezes.

A device which can be used for filtrating and humidifying air is known from the U.S. Pat. No. 2,106,025. This device comprises a rotary system of two worms which are built together and interconnected at their central coils, said worms having their respective coils oppositely directed to one another and having part of the periphery immersed in water. During rotation one worm lifts quantities of water towards its centre, and the other worm then lowers the water to the starting level again. It is expressly stated in the patent that the water used for humidifying the air is polluted by the use of the device, and therefore the artisan will not be induced to consider using this device for purifying waste water, nor are such theoretical possibilities mentioned in the patent.

SUMMARY OF THE INVENTION

Like the device disclosed by the aforementioned U.S. patent, the device of the present invention consists of two worms which are built together and interconnected at their central coils and have their respective coils oppositely directed from one another. The present device differs from the known device in that both the lifting worm and the lowering worm are filled with a suitable medium on which microorganisms can grow. The selection of medium can be adapted to the nature of the waste water.

When the device of the invention slowly rotates with part of its periphery immersed in water, one worm picks up quantities of water and lifts them towards its centre at each revolution. From there the water flows to the other worm which correspondingly lowers the water to the original level.

The following essential advantages are achieved over the prior art:

1. Constant alternating flushing and aerating of the medium in the entire system, which provides a better environment for biocoating and microorganisms and thus a higher degree of utilization per $m^2$ of interior surface.

2. The use of the present double worm for flushing a medium involves significant energy savings. For the weight of the rising water equalizes the weight of descending water and provides a torque so that supply of energy is only required to overcome the inertia of the water and the mechanical resistance.

There may be an airtight connection between the two worms so that air sucked into the lifting worm will leave through the lowering worm, or there may be an open connection so that the lowering worm sucks new quantities of air into its centre. This allows the ratio of air to water to be adjusted and thus an optimum activity to be maintained for the biocoating on the medium. Such an optimum activity can also be provided for by adjusting the depth of the immersion of the worm in the water. Thus, it is possible to use a fine-grained material with a larger surface without any risk of coalescence since the rather powerful flushing removes old residues of the biocoating. This eliminates a problem which occurs in the known filter plants when fine-grained media are used: the tendency of the passage through the medium becoming clogged owing to accumulations of old biocoating on the surface of the medium.

In the device of the invention the effective flushing causes any initial accumulations of bioresidues to be continuously removed, also when the medium is very fine-grained. This is so because a pressure of more than 100 $g/cm^2$ can be established in the worms that transport air and water. The powerful scavenging of the channels of the device causes a rather thin biocoating to be continuously formed, and such a coating has an optimum consumption of nutrients and thus an optimum efficiency.

The device of the invention has been found to work effectively at low temperatures without any tendency of freezing. The tests described below were carried out during an extremely hard winter period.

DESCRIPTION OF THE DRAWINGS AND THE PREFERRED EMBODIMENTS

Figure 2:
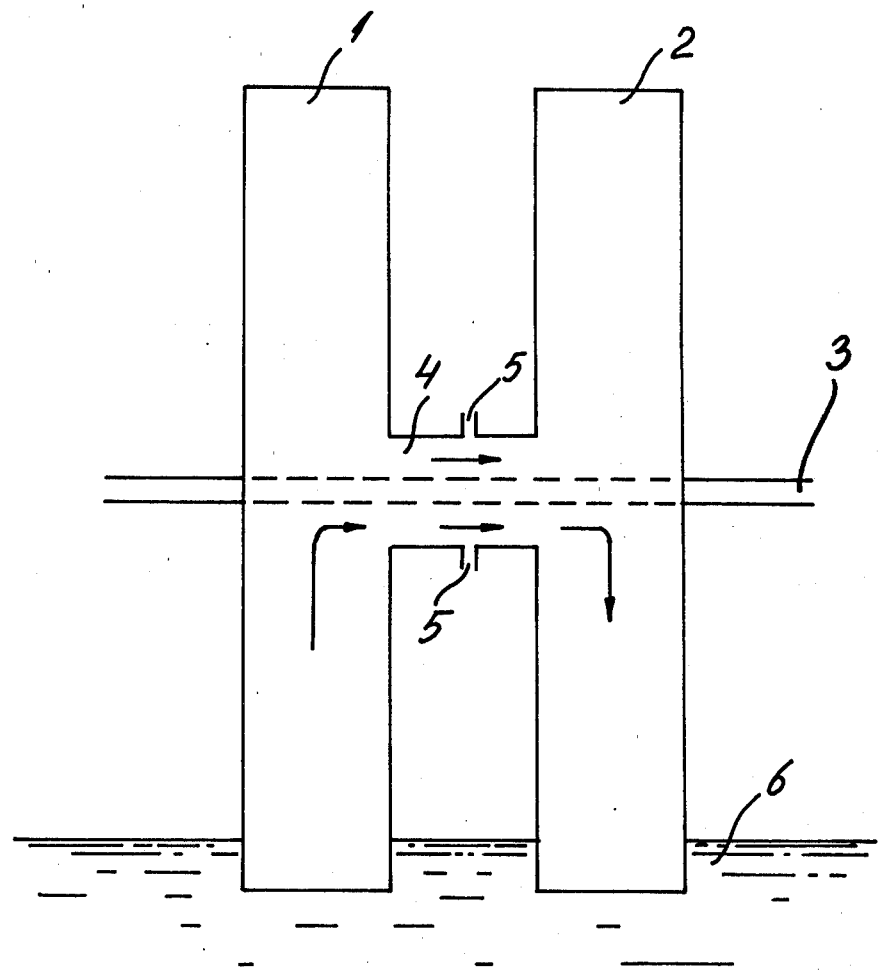

The device of the invention is illustrated in more detail in the accompanying FIGS. 1 and 2, of which FIG. 1 shows the principles of the two worms which may have any desired cross-section, e.g. circular, square or rectangular, and FIG. 2 shows the positions of the worms with respect to each other.

In the figures the lifting worm is designated (1) and the lowering worm is designated (2). The worms are filled with a medium (not shown) on which microorganisms can grow. The worms rotate about a horizontal axis (3), the inlet mouth (7) of the worm (1) being periodically immersed below the surface of the waste water in the schematically shown basin (6) to receive waste water, the outlet mouth (8) of the worm (2) discharging purified and aerated water to the basin (6). The worms are interconnected by a pipe conduit (4) which is not included in FIG. 1 for clarity. In FIG. 2 the conduit is shown with apertures (5) which may be omitted if desired.

According to the nature of the waste water to be purified, the present device may be combined with suitable known systems for pretreatment, such as mechanical purification and/or chemical precipitation, and secondary sedimentation of the water.

The device of the invention has been tested as appears from the test report below:

Test report

Tests have been carried out with a plant comprising a lifting and a lowering worm each having a diameter of about 2.5 m and each being filled with plastic fillers. The worms were placed in a pump basin of 7.5 m$^3$. The two worms were filled with a total of 6.4 m$^3$ plastic fillers having an overall surface of 730 m$^2$. The channel with fillers through which the water flows had a length of about 40 m and an inside diameter of 40×60 cm.

The biologically purified waste water flowed from the pump basin to a secondary sedimentation tank of 6.25 m$^3$. A plurality of spillways were used for adjusting the flow to the plant and the immersion of the drums. The waste water fed was mechanically purified in advance.

The test plant was operated at three different loads: 1, 3 and 5 m$^3$/h. At each load 24-hour-samples were taken for 3 days at intervals of one week from the plant inlet and outlet. As the hydraulic load of the plant was kept constant in each period, the samples were taken in proportion to time. During the entire test the drums were immersed about 35 cm and had a rate of revolution of 3.97 revolutions per minute.

Table I below shows the results as regards reduction in organic matter (measured as COD and BOD) and nitrification (conversion of $NH_3$-N to $NO_2+NO_3$-N).

The outlet samples contained varying amounts of suspended matter which accounts for the differences in BOD and COD between nonfiltered and filtrated samples.

The secondary sedimentation tank of the test plant was a rectangular basin with a flat bottom, the overflow edge of the outlet from the basin was short (50 cm), and the sludge was discontinuously removed (approx. every fourteen days). Such a construction and operation of a secondary sedimentation tank can be improved, and it must therefore be expected that the content of suspended matter in the outlet was generally higher than would have been the case if the plant had been provided with a secondary sedimentation tank of optimum construction with more frequent removals of sludge.

It is therefore only reasonable that the purification effect of the plant is evaluated on the basis of the analyses of the filtrated outlet samples.

TABLE I

| 24-hour-sample | Flow m$^3$/h | Temp. °C. | COD (mg/l) Inlet | COD (mg/l) Outlet Non-filtr. | COD (mg/l) Outlet Filtr. | BOD (mg/l) Inlet | BOD (mg/l) Outlet Non-filtr. | BOD (mg/l) Outlet Filtr. | Concentration of nitrogen Inlet Total-N | Outlet Total-N | Outlet $NH_3$—N | Outlet $NO_2+NO_3$—N |
|---|---|---|---|---|---|---|---|---|---|---|---|---|
| A | 5 | 4 | 280 | 95 | 65 | 92 | 46 | 23 | 29 | 27 | 19 | 3 |
| B | 5 | 6 | 270 | 140 | 69 | 130 | 31 | 16 | 24 | 18 | 12 | 1.2 |
| C | 5 | 5 | 160 | 84 | 45 | 51 | 47 | 14 | 18 | 14 | 6 | 6 |
| D | 3 | 7 | 210 | 87 | 83 | 97 | 33 | 13 | 14 | 15 | 13 | — |
| E | 3 | 8 | 170 | 51 | 28 | 80 | 21 | 8 | 14 | 9 | 3.5 | — |
| F | 3 | 8 | 260 | 70 | 40 | 120 | 22 | 10 | 30 | 14 | 3 | 2 |
| G | 1 | 7 | 440 | 66 | 38 | 200 | 21 | 7 | 33 | 23 | 15 | 3 |
| H | 1 | 7.5 | 360 | 33 | 11 | 180 | 21 | 12 | 31 | 17 | 7 | 6 |
| I | 1 | 7 | 340 | 32 | 22 | 130 | 18 | 5 | 18 | 16 | 3 | 11 |
| J | 5 | 11 | 250 | 96 | 57 | 110 | 56 | 20 | 27 | 19 | 9 | 5 |

All 24-hour-samples were also analyzed for the following parameters:

Inlet

IK (chemical oxygen demand with $KMnO_4$)
COD (chemical oxygen demand with $K_2Cr_2O_7$)
BOD (biochemical oxygen demand for 5 days)
Total-N
Total-P
Ortho-P
pH Outlet IK (filtrated and nonfiltrated)
COD (filtrated and nonfiltrated)
BOD (filtrated and nonfiltrated)
Total-N, $NH_3$-N and $NO_2+NO_3$-N
Total-P
Ortho-P
Suspended solids
2 hours' precipitate
pH The results of the analysis are tabulated in Table II:

TABLE II

| 24-hour-sample | | A Inlet | A Outlet | B Inlet | B Outlet | C Inlet | C Outlet | D Inlet | D Outlet | E Inlet | E Outlet |
|---|---|---|---|---|---|---|---|---|---|---|---|
| IK nonfiltr. | (mg/l) | 65 | 37 | 86 | 56 | 51 | 18 | 72 | 29 | 51 | 18 |
| IK filtr. | (mg/l) | | 20 | | 22 | | 17 | | | | 13 |
| COD nonfiltr. | (mg/l) | 280 | 95 | 270 | 140 | 160 | 84 | 210 | 87 | 170 | 51 |
| COD filtr. | (mg/l) | | 65 | | 69 | | 45 | | | | 28 |
| BOD nonfiltr. | (mg/l) | 92 | 46 | 130 | 31 | 51 | 47 | 97 | 33 | 80 | 21 |
| BOD filtr. | (mg/l) | | 23 | | 16 | | 14 | | | | 8 |
| Total-N | (mg/l) | 28.5 | 27.1 | 24.4 | 18.0 | 18.2 | 14.1 | 13.7 | 15.4 | 14.4 | 9.2 |
| $NH_3$—N | (mg/l) | | 19 | | 12 | | 6 | | 13 | | 3.5 |
| $NO_2 + NO_3$—N | (mg/l) | | 2.6 | | 1.2 | | 6.1 | | | | |
| Total-P | (mg/l) | 10 | 9 | 9.1 | 6.9 | 3.8 | 3.0 | 7.2 | 5.7 | 4.9 | 2.8 |
| Ortho-P | (mg/l) | 6.4 | 6.4 | 3.8 | 4.6 | 1.5 | 1.6 | 2.8 | 3.2 | 1.4 | 1.5 |
| Susp. solids | (mg/l) | | <5 | | | | | | 39 | | 37 |
| 2-h precipitate | (ml/l) | 1.3 | <0.1 | 2.0 | 0.3 | 1.5 | 0.2 | 2.5 | 0.2 | 2.5 | <0.1 |
| pH | | 7.4 | 7.3 | 7.6 | 7.7 | 7.7 | 7.9 | 7.7 | 7.9 | 7.6 | 7.9 |

| 24-hour-sample | | F Inlet | F Outlet | G Inlet | G Outlet | H Inlet | H Outlet | I Inlet | I Outlet | J Inlet | J Outlet |
|---|---|---|---|---|---|---|---|---|---|---|---|
| IK nonfiltr. | (mg/l) | 61 | 16 | 130 | 21 | 100 | 20 | 80 | 15 | 67 | 31 |
| IK filtr. | (mg/l) | | 14 | | 12 | | 16 | 80 | 10 | | 19 |
| COD nonfiltr. | (mg/l) | 260 | 70 | 440 | 66 | 360 | 33 | 340 | 32 | 250 | 96 |
| COD filtr. | (mg/l) | | 40 | | 38 | | 11 | | 22 | | 57 |
| BOD nonfiltr. | (mg/l) | 120 | 22 | 200 | 21 | 180 | 21 | 130 | 18 | 110 | 56 |
| BOD filtr. | (mg/l) | | 10 | | 7 | | 12 | | 5 | | 20 |
| Total-N | (mg/l) | 29.6 | 14.0 | 33.4 | 22.9 | 30.8 | 16.6 | 18.4 | 16.3 | 27.0 | 19.0 |
| $NH_3$—N | (mg/l) | | 3 | | 15 | | 7 | | 3 | | 9 |
| $NO_2 + NO_3$—N | (mg/l) | | 2.1 | | 3.3 | | 6.1 | | 11.4 | | 4.7 |
| Total-P | (mg/l) | 9.4 | 5.0 | 14 | 8.5 | 8.9 | 6.6 | 5.9 | 5.1 | 12 | 8.6 |
| Ortho-P | (mg/l) | 2.8 | 2.5 | 5.0 | 6.0 | 4.1 | 5.6 | 1.4 | 4.0 | 5.4 | 5.8 |
| Susp. solids | (mg/l) | | 23 | | 14 | | 9.8 | | 11 | | 39 |
| 2-h precipitate | (ml/l) | 2.0 | <0.1 | 4.5 | <0.1 | 4.0 | <0.1 | 8.0 | <0.1 | 1.6 | 0.2 |
| pH | | 7.7 | 7.6 | 7.6 | 7.9 | 7.8 | 8.0 | 7.4 | 7.8 | 7.2 | 7.6 |

Table III shows the average degrees of purification and average outlet qualities of COD and BOD for each of the three load intervals examined. The standard deviation from these averages is also shown.

TABLE III

Degree of purification and outlet quality. Based on filtrated outlet samples.

| Hydraulic load $m^3/h$ | Number of samples | COD Degree of purification % Average | COD Degree of purification % St. dev. | COD Outlet concentr. mg/l Average | COD Outlet concentr. mg/l St. dev. | BOD Degree of purification % Average | BOD Degree of purification % St. dev. | BOD Outlet quality Average | BOD Outlet quality St. dev. |
|---|---|---|---|---|---|---|---|---|---|
| 1 | 3 | 94 | 2.8 | 24 | 14 | 95 | 1.7 | 8 | 3.6 |
| 3 | 3 | 76 | 14 | 50 | 29 | 89 | 2.6 | 10 | 2.5 |
| 5 | 4 | 75 | 2.5 | 59 | 11 | 79 | 6.9 | 18 | 4.0 |

These purification degrees are exclusively based on the reduction of BOD and COD which took place in the biological part of the plant, there being no mechanical purification. A mechanical purification is normally expected to provide a BOD reduction of about 30%. If the purification in the mechanical part is included, which must be a natural thing to do, the purification degrees for BOD for the three loads correspond to 97, 92 and 85% respectively in a combined mechanical-biological plant.

These purification degrees and the low outlet concentrations show that the plant is capable of effectively purifying about 120 $m^3$ of waste water per 24 hours.

The production of sludge turned out to be about 0.5 kg of sludge per kg of BOD.

The average results of purification for the three loads are listed in table IV:

TABLE IV

Average results of purification

| Hydraulic load $m^3/24$ h | Organic load kg BOD/24 h | Degree of purification % | kg BOD removed | g BOD removed/ $m^2$ surface/24 h |
|---|---|---|---|---|
| 24 | 9.6 | 94 | 9.0 | 12.4 |
| 72 | 15 | 76 | 11.4 | 15.6 |
| 120 | 28 | 75 | 21.2 | 29.1 |

The organic load corresponds to 1.5, 2.4 and 4.4 kg of BOD/24 h/$m^3$ of filter material. As can be seen from Table IV, the removal of BOD per $m^2$ of filter surface is great compared with the removal obtained with highly loaded plastic filters (about 6–20 g of BOD/24 h/$m^2$ of surface).

Table IV shows that increasing hydraulic loads surprisingly results in rapid increases in g of BOD removed per $m^2$ of filter surface per 24 hours. This is of great interest e.g. in fish farms.

In the operation of the test plant the two drums were powered by an electric motor with an average consumption of energy of 16 kWh/24 h. Of this amount about 12 kWh were used for compensating losses in the gear, while only 4 kWh were used for the rotation of the worms. The energy consumption of 16 kWh/24 h is low compared with both other small biological purification plants and with large plants.

A plant for removing 100 kg of BOD/24 h requires a filter surface of about 3500 m² at a hydraulic load of 60–75 m³/24 h, corresponding to five times as many fillers as in the test plant described above. Such a plant can be constructed as a combination of several devices of the invention, mounted on the same axis. It is estimated that such a plant, which e.g. is suitable for purifying waste water from dairies (reduction of BOD from 2000 to 400 mg/l) has a consumption of energy of only 40 kWh/24 h, corresponding to 0.4 kWh/kg of BOD removed.

I claim:

1. A purification apparatus for alternately flushing and aerating water supplied from a body of water comprising:
   a first spirally coiled tube;
   a second spirally coiled tube, oppositely directed and in lateral coaxially spaced relation to said first spirally coiled tube;
   a conduit connected to and communicating with the centers of said first and second spirally coiled tubes;
   a particulate medium on which microorganisms can grow placed within each of said first and second spirally coiled tubes;
   a means for rotating said first and second spirally coiled tubes about an axis passing through said conduit, said axis placed above and at such distance from the surface of the water such that when said first and second spirally coiled tubes are rotated the outer free opening of said first spirally coiled tube is disposed below the surface of the body of water during part of its rotation and serves as in inlet alternately for water and air and the outer free opening of said second spirally coiled tube is disposed below the surface of the water during part of its rotation and serves as an outlet alternately for air and water whereby the effect of admission of water to the inlet of said first spirally coiled tube and efflux from said second spirally coiled tube provides a torque which assists in rotating the spirally coiled tubes.

2. The apparatus according to claim 1, wherein said conduit comprises an imperforate pipe sealingly connected to said first and second spirally coiled tubes.

3. The apparatus according to claim 1, wherein said conduit has perforations therein.

4. The apparatus according to any of claims 1, 2 or 3, wherein said medium comprises plastic filler.

* * * * *